(12) United States Patent
Robertsson et al.

(10) Patent No.: US 7,715,987 B2
(45) Date of Patent: *May 11, 2010

(54) METHOD OF AND APPARATUS FOR PROCESSING SEISMIC DATA

(75) Inventors: Johan Olof Anders Robertsson, Oslo (NO); Andrew Curtis, Edinburgh (GB); Dirk-Jan Van Manen, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/176,356

(22) Filed: Jul. 19, 2008

(65) Prior Publication Data
US 2008/0275650 A1    Nov. 6, 2008

Related U.S. Application Data

(63) Continuation of application No. 10/502,451, filed as application No. PCT/GB03/00240 on Jan. 20, 2003, now Pat. No. 7,418,349.

(30) Foreign Application Priority Data
Jan. 25, 2002   (GB)  ................... 0201646.7

(51) Int. Cl.
*G01V 1/00*   (2006.01)
*G01V 1/38*   (2006.01)

(52) U.S. Cl. ......................... 702/14; 367/24

(58) Field of Classification Search ............ 702/14, 702/1, 2, 11, 13, 18, 66, 67, 73, 189; 367/14, 367/15, 21, 24, 54, 73; 181/108, 110, 112, 181/113, 122
See application file for complete search history.

(56) References Cited

U.S. PATENT DOCUMENTS 7,418,349 B2 * 8/2008 Robertsson et al. ........... 702/14
2005/0068850 A1 * 3/2005 Muyzert et al. ............... 367/38

* cited by examiner

*Primary Examiner*—Michael P. Nghiem
*Assistant Examiner*—Toan M Le
(74) *Attorney, Agent, or Firm*—WesternGeco L.L.C.

(57) ABSTRACT

A method of processing seismic data that includes including first and second modes of seismic energy where the second mode has been generated by partial mode conversion of the first mode at a boundary face of a layer of the seabed includes the step of cross-correlating a trace acquired at a receiver and including events corresponding to the first mode with a trace acquired at the same receiver and including events corresponding to the second mode. An event in the cross-correlated data that corresponds to partial mode conversion is identified, and the amplitude of this event is normalized, for example relative to the amplitude of the peak in the cross-correlogram at zero time delay. Information about the effects of the static shift produced by the layer and/or about vector infidelity can be arrived from normalized cross-correlograms for receivers in a receiver array.

17 Claims, 7 Drawing Sheets

FIG 4
Cross-correlogram between vertical and horizontal components in figure 3.

FIG 5
Cross-correlogram stack (P and vx) using a 2D line from the Kappa survey.

Figures 6(a) and 6(b): Same data as shown in figure 5. Figure 6(a) (Upper): raw data Figure 6(b) (Lower): data after normalizing to the peak at lag-time 0.

FIG 7

A perturbation correction estimated from the plots in figure 6(b).

FIG. 8

METHOD OF AND APPARATUS FOR PROCESSING SEISMIC DATA

RELATED APPLICATIONS

This application is a continuation of U.S. patent application Ser. No. 10/502,451, filed Nov. 30, 2005, titled METHOD OF AND APPARATUS FOR PROCESSING SEISMIC DATA, now issued as U.S. Pat. No. 7,418,349 and the disclosure of which is herein incorporated by reference; which is a US national phase application of PCT/GB03/00240, filed Jan. 20, 2003, titled A METHOD OF AND APPARATUS FOR PROCESSING SEISMIC DATA, and the disclosure of which is herein incorporated by reference; which is an international application of GB Patent Application Serial Number 0201646.7, filed Jan. 25, 2002, titled A METHOD OF AND APPARATUS FOR PROCESSING SEISMIC DATA, and the disclosure of which is herein incorporated by reference.

FIELD

The present invention relates to a method of processing seismic data. It particularly relates to a method of processing seismic data that includes two corresponding modes of seismic energy propagation, for example where one mode arises from partial mode conversion of another mode at a boundary of a layer of the earth. The method of the invention provides an estimate of static shifts caused by a layer at or near the earth's surface that has different seismic properties from the underlying layers. The invention also relates to a method of seismic surveying that includes processing acquired seismic data in the above way. The invention further relates to an apparatus for processing seismic data.

SUMMARY

Figure 1:
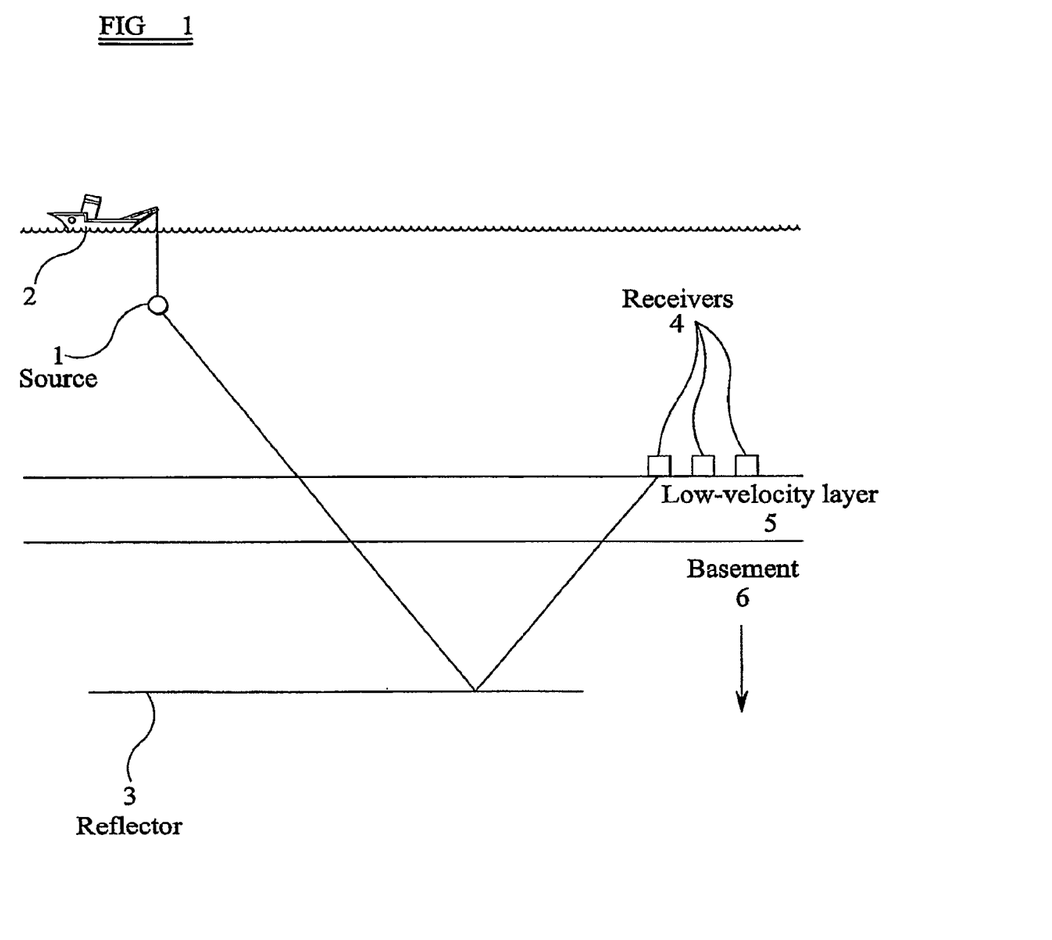
FIG. 1 is a schematic view of a marine seismic survey.

FIG. 1 is a schematic view of a seismic surveying arrangement. In this figure the surveying arrangement is a marine surveying arrangement in which seismic energy is emitted by a seismic source 1 that is suspended beneath the sea-surface from a towing vessel 2. When the seismic source 1 is actuated seismic energy is emitted downwards, passes into the earth's interior and is reflected by a geological feature 3 that acts as a partial reflector of seismic energy. The reflected seismic energy passes upwards through the earth's interior, into the sea and is detected by an array of seismic receivers 4 disposed on the sea-bed. The seismic energy path shown in FIG. 1 is generally referred to as the "primary path". Information about the earth's interior is obtained, for instance, by determining the travel time of seismic energy from the seismic source 1 to the receiver 4 along the primary path.

In practice refraction will occur at the seabed and at boundaries between layers of different geological composition within the earth, but this has been omitted from FIG. 1 for clarity. Only one reflector of seismic energy is shown in FIG. 1 but, in practice, a number of geological features within the earth's interior will act as partial reflectors for the seismic energy. Moreover, only one source 1 is shown in FIG. 1 but in practice a marine seismic surveying arrangement may have an array of sources.

One problem encountered in processing seismic data is that the geological structure of the earth is not uniform. In particular the properties of the region 5 of the earth near the surface (hereinafter referred to as the "near-surface") are frequently significantly different from the properties of the underlying geological structure 6 (hereinafter referred to as the "basement"). This can occur if, for example, the near-surface is less consolidated than the basement. In particular, the velocity of seismic energy may be significantly lower in the near-surface 5 than in the basement 6, and for this reason the near-surface is sometimes known as a "low-velocity layer" (LVL). This difference in velocity will produce a shift in the travel time of seismic energy from the source 1 to a receiver 4 compared to the travel time that would be recorded if the near-surface and the basement had identical seismic properties, and these shifts in travel time are generally known as "static shifts", or just "statics".

The near surface may also affect the seismic energy incident on the receiver in other ways. For example, the near surface may have a focusing or defocusing effect on seismic energy propagating through it, and this can affect the amplitude of seismic energy received at a receiver. The near-surface may also attenuate the amplitude of seismic energy propagating through it. Furthermore, anelastic attenuation and focusing/defocusing effects in the near surface may also distort the waveform of the seismic energy wavelet.

Although FIG. 1 illustrates the near surface 5 in connection with a marine seismic survey, a similar near-surface region occurs on land so that static shifts also arise in a land-based seismic survey.

The near surface 5 is shown as extending to the earth's surface (the sea-bed) in FIG. 1, but it need not extend to the surface and there could be a further layer (not shown) overlying the near surface 5. Furthermore, although FIG. 1 shows a well-defined boundary between the near-surface 5 and the basement 6 in practice there may be a gradual transition between the basement 6 and the near-surface 5 rather than an abrupt boundary.

The static shift generated by the near-surface 5 depends on the thickness of the near-surface, and on the velocity of propagation of seismic energy through the near-surface. Lateral variations usually occur in both the thickness of the near-surface 5 and the propagation velocity through the near-surface, so that the static shift observed at a seismic receiver at one location is likely to be different from the static shift observed at a receiver at another location. To a first approximation, the entire data set recorded at one receiver will be advanced or delayed by a static time shift relative to data recorded at another receiver.

It is highly desirable to take account of the static shift when processing seismic data. Unless these static shifts are removed from the seismic data, ambiguity will exist as to whether variations in arrival times of seismic events from deeper layers are due to variations in the depth or lateral locations of those deeper layers, or simply arise owing to propagation effects in the near-surface 5.

It will be seen from FIG. 1 that the seismic energy passes through the near-surface 5 twice, once as it travels from the seismic source 1 to the reflector 3, and again as it travels from the reflector 3 to the receiver 4. Both traverses of the near-surface 5 will cause static shifts; the shift caused as the downwardly propagating seismic energy passes through the near-surface 5 is known as the source-side static shift, and the shift caused as the upwardly propagating energy passes through the near-surface 5 is known as the receiver-side static shift.

The method of the present invention makes use of an s-mode event and a corresponding p-mode event to obtain information about the low velocity layer. It assumes that the differences between the s-mode event and the corresponding s-mode event, for example differences in the travel time, amplitude and/or waveform of the events, arise wholly or primarily in the near-surface 5.

One embodiment of the invention makes use of an s-mode event and a corresponding p-mode event where one of the modes has been generated by partial mode conversion of the other mode. For example, if the contrast in physical properties between the basement 6 and the near-surface 5 is sufficiently great, significant conversion between a p-mode of energy propagation and an s-mode of energy propagation, or vice-versa, takes place as seismic energy propagates through the boundary between the basement 6 and the near-surface 5. This mode conversion is described more fully below with reference to FIG. 2. As a result of this mode conversion, for every p-mode event recorded by a seismic receiver above the boundary between the near-surface and the basement there will be a corresponding s-mode event. The p-mode event and the corresponding s-mode event will occur at a receiver 4 at different times after actuation of the seismic source, because the p-mode and s-mode propagation velocities in the near-surface are not equal to one-another. However, since the mode conversion occurs at the lower boundary of the near-surface, the time delay between the p-mode event and the corresponding s-mode event must arise as the result of different velocities for the two modes in the near-surface. The time delay between the p-mode event and the corresponding s-mode event will not be significantly influenced by the properties of the basement. The travel time difference between the p- and s-modes through the near-surface can thus be readily determined by identifying a p-mode event and the corresponding s-mode event in the seismic data and determining the time delay between the p-mode event and the corresponding s-mode event.

For any parameter indicative of an aspect of the seismic data such as, for example, the pressure or a component of the particle motion (such as a component of the particle displacement or particle velocity), events of one of the p- and s-modes will generally appear more strongly than will events of the other mode. Thus, in general, a p-mode will occur predominantly in one parameter, such as the vertical component of the particle motion and the corresponding mode-converted s-mode will occur predominantly in another parameter, such as a horizontal component of the particle motion.

Mode conversion may also occur when a downwardly propagating wave undergoes reflection at the interface between the near-surface 5 and the basement 6. The invention may be applied to this case since, where mode conversion occurs on reflection, the reflected signal will contain a p-component and a corresponding s-component, and the two components will have different travel times through the near-surface 5.

Mode conversion may also occur when a downwardly propagating wave undergoes critical refraction at the interface between the near-surface 5 and the basement 6, to generate a seismic wave propagating along the interface between the near-surface 5 and the basement 6. The wave propagating along the interface will excite both p-mode and s-mode waves in the near-surface, and the invention can be applied to these p- and s-modes.

Co-pending UK patent application Nos. 0101936.3 and 0110573.3 disclose a method of determining the difference between the static shift for a p-wave and the static shift for an s-wave generated by mode-conversion at the boundary between the near surface and the basement. Pairs of a p-event and a corresponding s-event are identified in the seismic data, and the travel time difference between the p-event and the corresponding s-event is found. This travel time difference is the difference between the s-wave static shift and the p-wave static shift for a particular receiver.

Many seismic surveys now use multi-component receivers that record two or more component of the seismic energy incident on the receiver. For example a 3-component (3-C) seismic receiver can record the x-, y- and z-components of the particle motion at the receiver, and in a marine survey a 4-component (4-C) seismic receiver can record the pressure of the water column (which is a scalar quantity) in addition to the x-, y- and z-components of the particle motion. A further problem arises in processing multi-component seismic data, which is that a receiver may record some components of the seismic data more accurately than other components. This problem is known as vector infidelity. One cause of vector infidelity is inadequate coupling between the receiver and the earth's surface so that, in a receiver array, the effects of vector infidelity may vary from one receiver of the array to another. Such vector infidelity will degrade the results obtained by processing the seismic data.

A first aspect of the present invention provides a method of processing seismic data including corresponding first and second modes of seismic energy, the method comprising the steps of:

a) processing a trace indicative of a first parameter of the seismic data acquired at a first receiver including at least events corresponding to the first mode with a trace indicative of a second parameter of the seismic data acquired at the first receiver including at least events corresponding to the second mode;

b) identifying an event in the processed data corresponding to partial mode conversion; and c) obtaining information from the amplitude and/or the waveform in the processed data of the event corresponding to partial mode conversion.

The present invention may be used to obtain information about properties of the near surface from the amplitude and/or the waveform of the event corresponding to partial mode conversion. Additionally or alternatively, it may be used to obtain information about variations in coupling strength from one receiver to another.

In a preferred embodiment the invention is applied to data in which the second mode was generated by partial mode conversion of the first mode at a boundary face of a layer of the seabed. However, the invention is not limited to this, and may generally be applied to any pair of events, one in one mode and one in another mode, for which differences between the amplitude and waveform of the two events will arise primarily in the low velocity layer.

The parameters of the seismic data that are used in the invention are preferably chosen so that a p-mode will occur predominantly in one parameter and the corresponding mode-converted s-mode will occur predominantly in the other parameter. The parameters may be parameters that are acquired directly at the receiver, such as the vertical component of the particle motion and a horizontal component of the particle motion. Alternatively, the parameters may be obtained by processing the seismic data acquired at the receiver, for example by decomposing the acquired seismic data into its up-going and down-going constituents or into its p- and s-constituents.

The method of the invention may be used to process pre-existing seismic data. Alternatively, it may be incorporated in a method of seismic surveying for processing the data as it is acquired or subsequently.

A second aspect of the present invention provides a method of seismic surveying comprising the steps of: directing seismic energy propagating in a first mode towards a boundary face of a layer of the seabed such that partial mode conversion of the seismic energy into a second mode occurs at the boundary face; acquiring seismic data including the first and second modes of seismic energy at one or more receivers; and processing the seismic data according to a method as defined above.

A third aspect of the invention provides an apparatus for processing seismic data including first and second modes of seismic energy, the apparatus comprising:
a) means for processing a trace indicative of a first parameter of the seismic data acquired at a first receiver including at least events corresponding to the first mode with a trace indicative of a second parameter of the seismic data acquired at the first receiver including at least events corresponding to the second mode;
b) means for identifying an event in the processed data corresponding to partial mode conversion; and
c) means for obtaining information from the amplitude and/or the waveform of the event in the processed data corresponding to partial mode conversion.

The apparatus may comprise a programmable data processor.

A fourth aspect of the present invention provides a storage medium containing a program for a data processor of an apparatus as defined above.

Preferred embodiments of the present invention will now be described in detail by way of illustrative example with reference to the accompanying figures in which:

DETAILED DESCRIPTION

Figure 2:
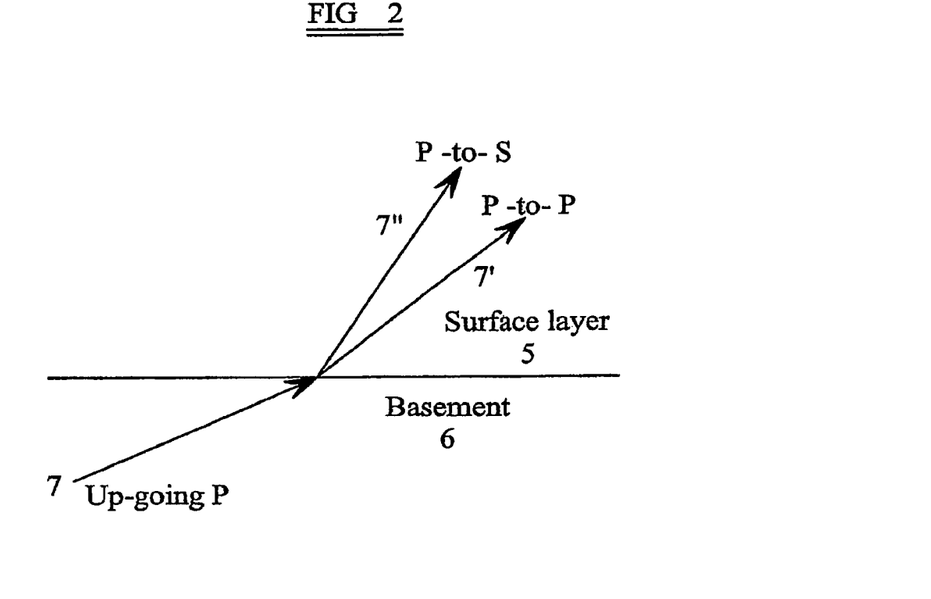
FIG. 2 is a schematic illustration of mode conversion of an up-going p-wave at the boundary between the basement and a low-velocity layer.

The principle of the invention will now be described with reference to an embodiment in which the pair of corresponding events are generated by partial mode conversion. FIG. 2 illustrates the occurrence of mode conversion as an upwardly propagating p-wave passes through the interface between the basement 6 and the near-surface 5. The up-going p-wave 7 is partially transmitted as a p-wave 7', but also undergoes partial mode conversion to an s-wave 7". It is assumed that the upward-going p-wave was generated by a reflection from a deep interface between two layers of the earth's interior, or by refraction through deeper layers. Refraction will also occur at the interface between the basement 6 and the near-surface 5, and the angle of refraction for the transmitted p-wave 7' will be different from the angle of refraction for the converted s-wave 7".

The transmitted p-wave 7' and the converted s-wave 7" will both produce a signal at the receiver array. The transmitted p-wave 7' and the converted s-wave 7" are, as indicated in FIG. 2, travelling in different directions and hence will arrive at different receiver positions, not at the same receiver. However, a similar converted s-wave from a neighbouring conversion point will arrive at the same receiver as the transmitted p-wave 7' shown in FIG. 2. It will be assumed that, for a transmitted p-wave and a converted s-wave received at a particular receiver, the difference between the conversion point (at the base of the near-surface) of the converted s-wave and the point in the base of the near-surface through which the p-wave was transmitted does not significantly affect estimates of the static shifts obtained by the method of the present invention. The data acquired at the receiver will thus contain an event arising from the arrival of the transmitted p-wave 7' and an event arising from the arrival of the corresponding mode-converted s-wave 7".

The transmitted p-wave 7 will be recorded predominantly on the vertical component of particle velocity recorded at the receiver, while the converted s-wave 7" will be recorded predominantly on the radial component of the particle velocity recorded at the receiver 4. (The radial direction is the source-receiver direction projected onto the sea-bed, and this direction will be defined to be the x-direction.) This is because in a practical seismic surveying arrangement waves that have propagated up from deep in the earth's interior tend to make an angle of 30.degree. or less to the vertical for a typical structure of the earth's interior and a typical depth of the target reflector. The shear wave is recorded predominantly on the radial component because the particle motion for a shear wave is perpendicular to the direction of propagation, compared to the particle motion for a p-wave which is along the direction of propagation.

Figure 3:
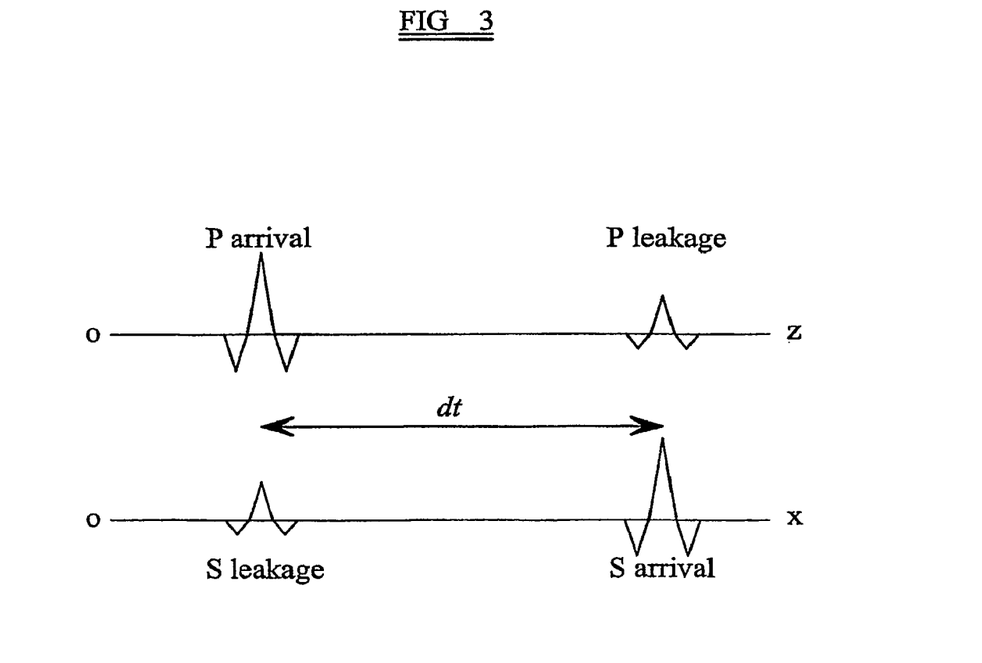
FIG. 3 shows two schematic examples of seismic data traces where the mode conversion of FIG. 2 occurs.

FIG. 3 is a schematic illustration of traces indicative of two parameters of seismic data recorded at a receiver 4 where partial mode-conversion as shown in FIG. 2 occurs. The two parameters shown in FIG. 3 are the radial component .alpha.-component) of the particle velocity measured at the receiver, and the vertical component (z-component) of the particle velocity measured at the receiver. Since the s-wave 7" was created as a conversion from the up-going p-wave 7, if the interface between the basement and the near-surface is approximately planar locally, then the recorded s-wave will contain a similar wavelet to the p-arrival signal. The s-wave arrival will not occur at the same time as the p-wave arrival but will arrive after a time delay dt (compared to the p-wave arrival) caused by the difference between the velocity of p-waves and the velocity of s-waves in the near-surface 5. This time delay dt is exactly the difference between the p-wave static shift and the s-wave static shift.

Figure 4:
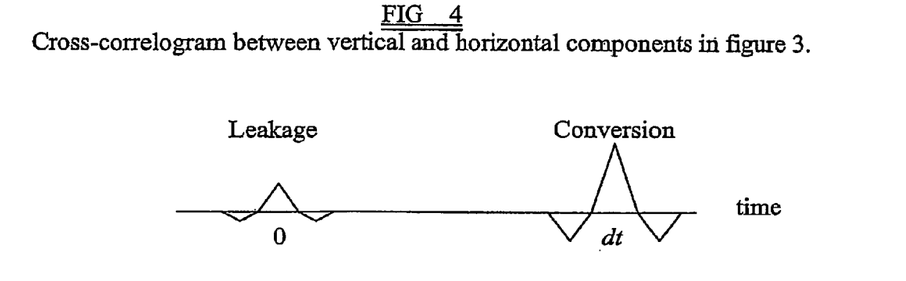
FIG. 4 shows the result of cross-correlating the two seismic data traces of FIG. 3 with one another.

In the method of co-pending UK patent application Nos. 0101936.3 and 0110573.3 the first parameter is cross-correlated with or deconvolved from the second parameter. The resultant cross-correlogram obtained by cross-correlating the two traces of FIG. 3 is shown in FIG. 4. There is a peak in the cross-correlogram at zero time shift, which arises because the p-wave 7' arrival has a non-zero amplitude in the x-component of the measured particle velocity (although it occurs predominantly in the z-component of the measured particle velocity). Any s-wave energy that appears in the vertical component of the measured particle velocity will also cause a peak in the cross-correlogram at zero time shift. The cross-correlogram also has a peak at time dt and this peak occurs from the p-wave arrival peak in the vertical component of the measured particle velocity and the corresponding, mode-converted s-wave arrival peak in the x-component of the measured particle velocity. Thus the time shift dt, and hence the difference between the p-wave static and the s-wave static, may be determined from the cross-correlogram.

Figure 5:
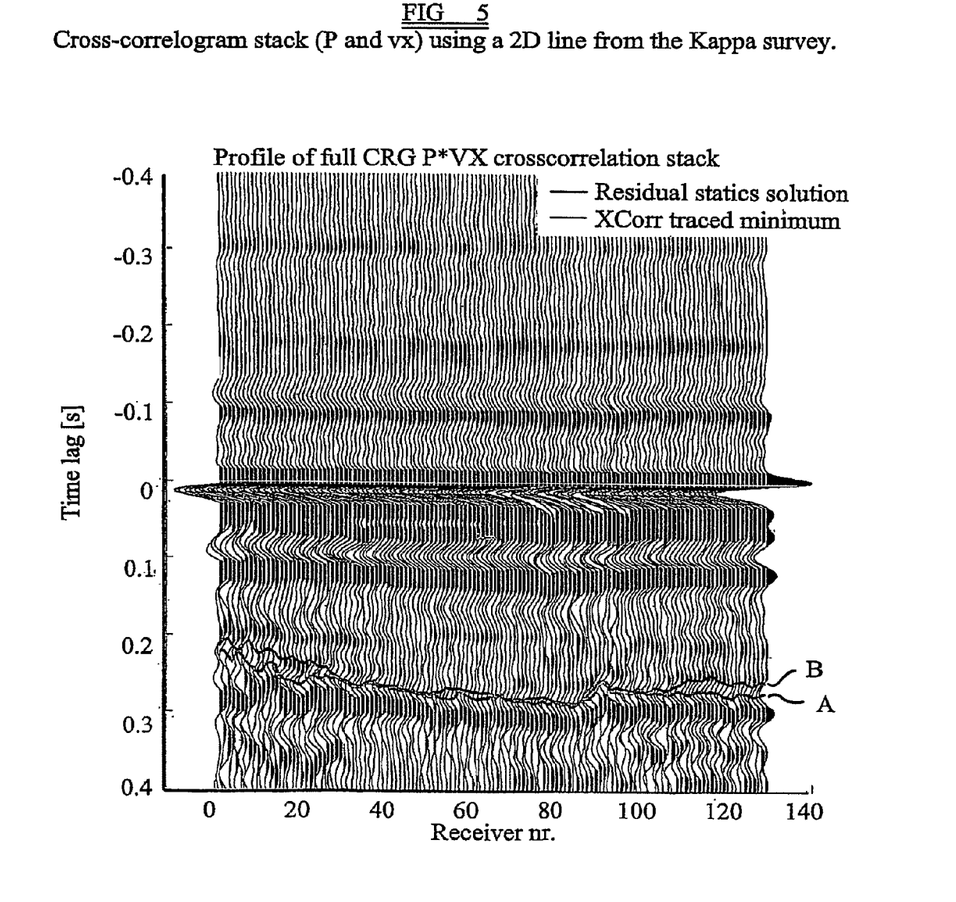
FIG. 5 illustrates results of the cross-correlation method of UK patent application Nos. 0101936.3 and 0110573.3.

FIG. 5 is a further illustration of the results of the method of co-pending UK Patent Application Nos. 0101936.3 and 0110573.3. These results were obtained using a receiver line containing approximately 130 receivers. FIG. 5 shows, for each receiver, the cross-correlogram obtained from the vertical component of particle motion recorded at that receiver and the x-component (radial component) of particle velocity recorded at that receiver. The difference between the p-wave static shift and the s-wave static shift for each receiver, as determined by the method of UK Patent Application Nos. 0101936.3 and 0110573.3, is indicated in FIG. 5 as "A". The difference between the p-wave static shift and the s-wave static shift obtained using a conventional technique is also illustrated in FIG. 5, as "B".

The method of UK Patent Application Nos. 0101936.3 and 0110573.3 provides an improved method of estimating the difference between the p-wave static shift and the s-wave static shift. However, this method makes use only of time information, and can determine only the time delay between a p-mode arrival and a corresponding s-mode arrival. It is not possible to determine from the method of UK Patent Application Nos. 0101936.3 and 0110573.3 whether the time delay is due to the geological effect of the near-surface, or whether it is due to other factors such as the coupling between receivers and the earth, or other sources of vector infidelity.

The present invention sets out to derive further information from the time delay between a p-mode event and a corresponding s-mode event, by considering variations in the amplitude and/or waveform of events in the correlation data.

One embodiment of the present invention will now be described with reference to FIGS. 6(a) to 7.

Figure 6A:
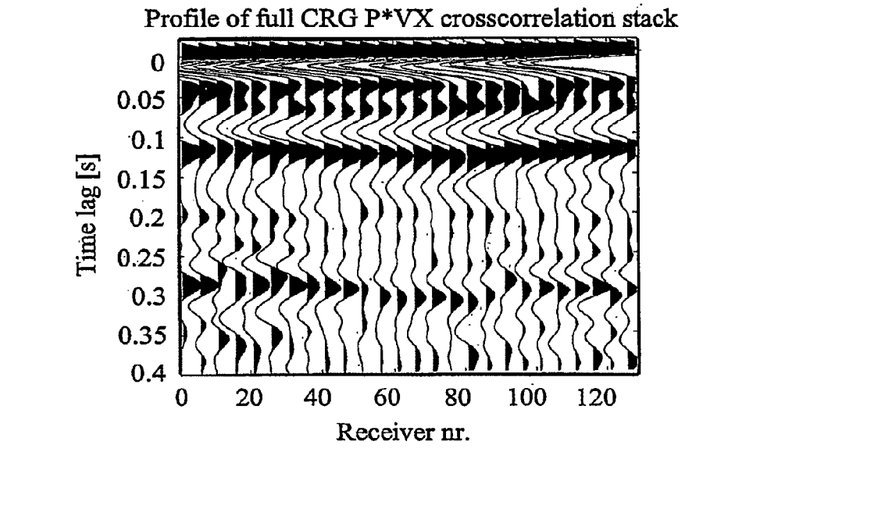
FIG. 6(a) is an enlarged view of selected traces from the results of FIG. 5.

FIG. 6(a) is an enlarged view of selected traces from FIG. 5. These traces that show the correlation of the p-mode and the s-mode will be referred to as "receiver functions" for convenience. FIG. 6(a) shows the receiver functions from FIG. 5 for every fifth receiver, for positive values of the time lag between the p-arrival and the s-arrival (a positive time lag indicates that the p-mode event arrived first at the receiver and was followed by the s-mode arrival, as shown in FIG. 3).

Figure 6B:
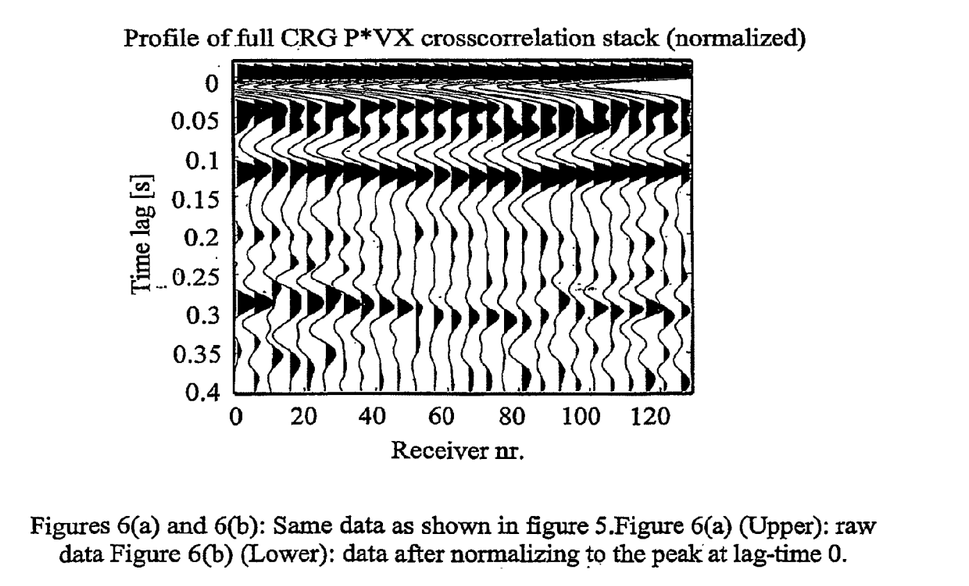
FIG. 6(b) shows the results of normalizing the traces of FIG. 6(a)

FIG. 6(b) shows the effect of normalizing the receiver functions of FIG. 6(a), with respect to the amplitude of the peak in each respective receiver function at zero time delay. That is, each receiver function in FIG. 6(b) is obtained from the corresponding receiver function in FIG. 6(a) by normalizing the receiver function so that the peak at zero time delay has the same amplitude for each receiver function in FIG. 6(b). As noted above, the peak at zero time delay in the receiver function of FIG. 4 or 5 arises through leakage of the p-wave arrival into the x-component of the measured particle motion, and through leakage of the s-wave arrival into the vertical component of the measured particle motion. That is, the amplitude of the peak at zero time delay in the receiver function for a particular receiver is indicative of the projection of the p-wave arrival onto the x-component of the particle motion recorded at that receiver and the projection of the s-wave arrival onto the y-component of the particle motion.

It may be seen by inspecting FIGS. 6(a) and 6(b) that the step of normalizing the receiver functions has not had a significant effect on the amplitudes of the events in the receiver functions. This indicates that the amplitude of the peak at zero time delay is approximately the same for each receiver. This in turn indicates that the projection of the p-wave arrival onto the x-component of the acquired particle motion is approximately constant for each receiver. It also indicates that there is no significant variation in the strength of the coupling for p-waves from one receiver to another.

It will be seen that the receiver functions in FIG. 6(b) contain a peak at a time lag of around 0.3 s, although the exact time lag at which this peak occurs varies slightly between receivers. This peak represents the time delay between a p-wave arrival and the corresponding mode converted s-wave arrival. The variations in the waveform and/or amplitude of this peak from one receiver to another can provide information about attenuation and focusing effects of s-waves in the near-surface.

The peak in the receiver functions that arises owing to the time delay between a p-wave and the corresponding mode-converted s-wave will be referred to as the "statics peak" for convenience. The amplitude and phase of the peak may also be influenced by variations in transmissivity and the extent to which mode conversion occurs at the interface between the near-surface and the basement. The transmissivity and conversion efficiency may vary over the interface as the result of, for example, changes in material properties or topography along the interface.

Figure 7:
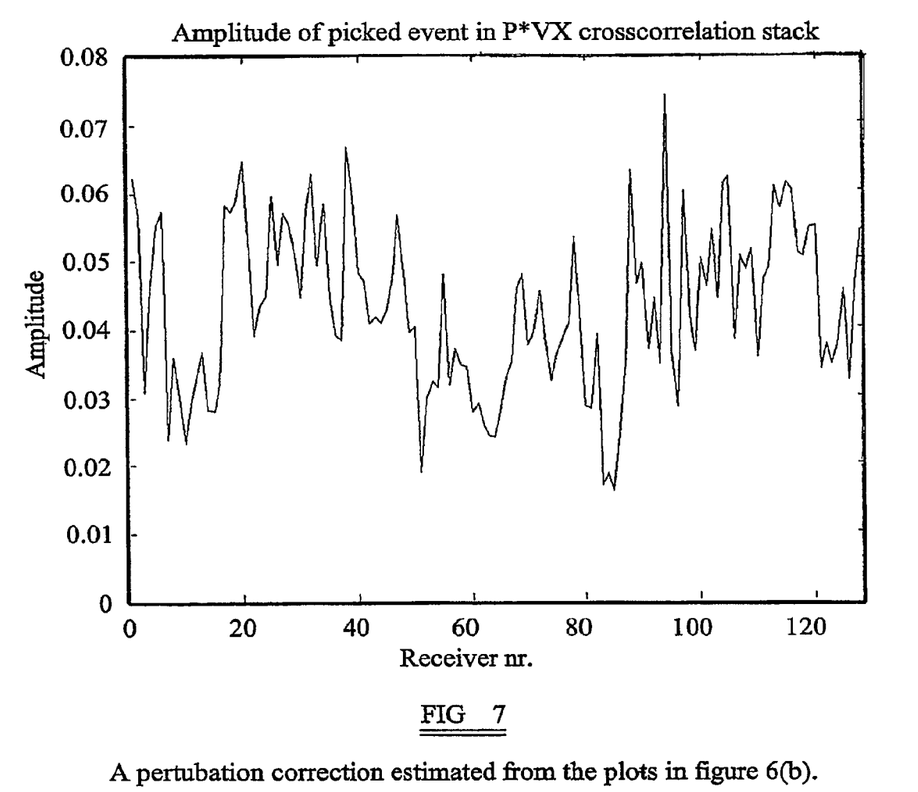
FIG. 7 shows the variation in amplitude of a selected event from the traces of FIG. 6(b)

FIG. 7 illustrates the amplitude of the "statics peak" (the peak at a time lag of around 0.3 seconds) for each receiver function shown in FIG. 6(b), plotted against the receiver number. FIG. 7 show the results for every receiver function shown in FIG. 5, and so includes data for more receivers than shown in FIG. 6(b).

It will be seen that FIG. 7 exhibits considerable variation of the normalized amplitude of the peak in the receiver function from one receiver to another. Short-wave length variations in the amplitude in FIG. 7 (that is variations that occur over a small number of receivers) are likely to be caused by variations in the receiver-to-earth coupling strength from one receiver to another. Long-wave length variations in the amplitude shown in FIG. 7 are more likely to be caused by geological effects arising from the near-surface structure, such as differences in the attenuation or focusing/defocusing caused by the near-surface from one receiver position to another. Thus, analysis of the amplitude variations shown in FIG. 7—for example, using a Fourier transform—can provide information about both geological effects and coupling effects.

The present invention also makes it possible to compensate for variations in the coupling strength between the receiver and the earth from one receiver position to another. Correcting for variations in the receiver coupling strength is important, as variations in the coupling strength can distort the amplitude and phase of an s-wave arrival relative to the corresponding p-wave arrival. Since the s-wave arrival is recorded predominantly in the x-component of the particle motion required at a receiver, variations in the coupling efficiency can distort the recorded x-component of the particle motion, with the amount of distortion varying from one receiver to another. This is particularly a problem in applications such as, for example, AVO ("Amplitude versus Offset) that require x-component particle motion recordings that are approximately consistent across the receiver spread and that can be directly compared to one another.

The amplitude of the normalized "statics peak" in the receiver functions of FIG. 6(b) or FIG. 7 is indicative of the strength of the mode-converted s-wave arrival which, as noted above, is caused by the near-surface. The amplitude of the "statics peak" is also indicative of the coupling strength of the receiver. The present invention makes it possible to compensate for variations in the effect of the near-surface and in the coupling strength from one receiver to another, by normalizing the amplitude of the original trace of the x-component of the particle motion acquired at a receiver relative to the amplitude of the "statics peak" in the normalized receiver function of FIG. 6(b) for that same receiver. That is, for each receiver, the amplitude of the "statics peak" in the normalized receiver function is determined, and this amplitude is then used to normalize the original trace of the x-component of the particle motion at that receiver. This procedure is repeated for each receiver—the trace of the x-component of the particle velocity recorded at that receiver is normalized by the amplitude of the "statics peak" in the normalized receiver function for that receiver. The result of this normalization process is to provide normalized x-component traces that are approximately consistent across the receiver spread, and that may be compared directly to one another. This process effectively enables the x-component of the particle motion recorded at a receiver to be calibrated against the vertical component of the particle motion recorded at that receiver (which should contain predominantly p-wave events and so be relatively unaffected by the near-surface or coupling variations).

If the y-component of the particle motion at the receiver is acquired as well as, or in addition to, the x-component of the particle motion, it would be possible to calibrate the y-component of the particle motion against the vertical component of the particle motion.

If full 3C or 4C seismic data are available, it is possible to compute two cross-correlograms—a first cross-correlogram of the x-component against the z-component of the particle motion, and a second cross-correlogram of the y-component against the z-component of the particle motion. Each of these correlograms may then be normalized so that the peak in the correlogram at zero time delay has the same amplitude in each trace. The two normalized cross-correlograms may then be directly compared against each other—because this process calibrates the x-component of the particle motion against the z-component of the particle motion and also calibrates the y-component of the particle motion against the z-component of the particle motion, and so is equivalent to calibrating the x-component of the particle motion against the y-component of the particle motion.

FIG. 7 includes only information about the amplitude variations of the traces in FIG. 6. However, it can be seen that the waveform of the "statics peak" in the cross-correlogram traces of FIG. 6(b) varies from one receiver position to another. The variations in the waveform of the static peaks may also provide information about the near surface and/or variations in coupling strength between the receiver and the earth from one receiver position to another.

Conceptually, it would be possible to construct a figure showing the variation in some measure of the waveform of the "statics peak"—such as, for example, the full width at half maximum height of the waveform—in the normalized receiver functions of FIG. 6(b). Such a figure would show how the waveform of this peak varies from one receiver position to another, and these variations in the waveform of the "statics peak" could also provide information about the geological effect of the near-surface and about variations in coupling strength between the receiver and the earth.

Alternatively, it would be possible to derive a filter that transforms the waveform of the "statics peak" in one of the receiver functions of FIG. 6(b) to an undistorted waveform, such as the waveform of the peak at zero time lag in the trace. The filter may then be applied to the original seismic data, for example to the original trace of the x-component of the particle motion. This process may be repeated for each receiver—the trace of the x-component for each receiver is transformed by the filter derived from the waveform of the "statics peak" in the receiver functions for that receiver. This process should provide normalized x-component traces that are approximately consistent across the receiver spread, and that may be compared directly to one another.

In the embodiments described above the receiver functions have been calculated by cross-correlation. The invention is not limited to this, however, and any suitable correlation technique or algorithm may be used to determine the receiver functions. For example the receiver functions could be obtained by deconvolution between component, and the amplitude and waveform information in the statics peak can then still be used in the same way as described above. Indeed, a receiver function obtained by deconvolution may be preferable since a deconvolution effectively removes the specific source signature of the p-wave (as it exists upon incidence at the near-surface/basement interface) such that the only effects left in the receiver function are those due to near-surface structure and/or vector-infidelity.

A further example of a suitable technique for obtaining the receiver functions is a bicoherence time delay estimation method, as described by L. Ikelle in "Geophysics", Vol 62, p 1947 (1997).

In the description of the invention given above, components of the particle velocity acquired at the receiver have been used as the components of particle motion in calculating the receiver functions. In principle, however, components of the particle displacement at the receiver, or components of the particle acceleration at the receiver, or higher derivatives of the particle velocity, could alternatively be used.

Indeed, the invention is not limited to use of components of the particle motion, and any suitable parameters of the acquired seismic data may be used to obtain the receiver functions. For example, the acquired seismic data may be decomposed into its up-going and down-going components, or into its p- and s-components, and these may be used to obtain the receiver functions.

The invention may also be applied to p- and s-wave "reverberation events". In such events partial mode conversion, for example upon transmission through or reflection at the interface between the near surface 5 and the basement 6. In a reverberation event, however, the p- and s-waves do not pass directly from the point at which the mode-conversion occurs to the receiver. In a reverberation event, however, the p- and s-waves undergo one or more reflection at a boundary of the near-surface and so make multiple passes through the near-surface 5 before being incident on the receiver.

Seismic data may also contains events that arise from partial mode conversion that occurs not at a boundary of the near-surface but within the near-surface. This may arise owing to, for example, layering effects in the near-surface.

In the embodiments described above one of the p- and s-wave events has been generated by partial mode conversion. However, as noted above, the invention is not limited to this and may be applied to any pair of corresponding p- and s-events for which differences in amplitude and/or waveform of the two events arise primarily from the near-surface 5. For example, in a seismic survey that uses a source that emits both p- and s-waves, the acquired data will contain an event arising from reflection of p-waves at a particular point on the lower boundary of the near-surface 5 and will also contain a corresponding event arising from reflection of s-waves at that point on the lower boundary of the near-surface 5. The invention may be applied to these events. (It should be noted that, since a water column will not support s-wave propagation, a source emitting both s- and p-modes would need to be disposed on the seabed, on the earth's surface or in a borehole.

Figure 8:
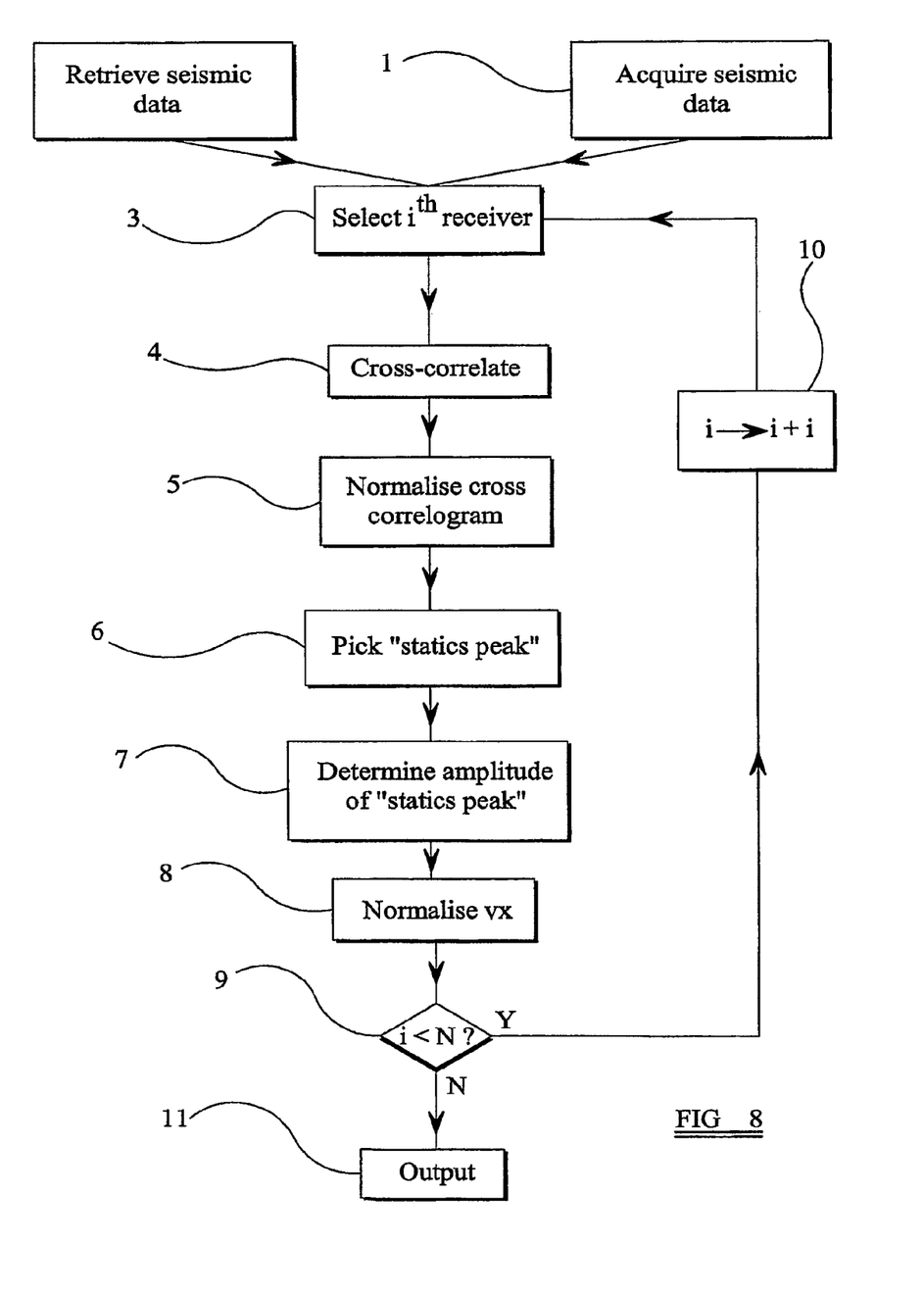
FIG. 8 is a block flow diagram of a method according to one embodiment of the present invention.

FIG. 8 is a block flow diagram illustrating one embodiment of the present invention. Initially, at step 1, multi-component seismic data is acquired at a survey location. The seismic data should include the vertical component of the particle motion and, at least one horizontal component of the particle motion. The data is acquired at a plurality of receivers disposed at different locations in the survey area. The multi-component data may be full 3C or 4-C seismic data.

Rather than applying the invention to newly-acquired seismic data, the invention may also be applied to pre-existing survey data. Step 1 may therefore be replaced by the step, step 2, of retrieving suitable multi-component seismic data from storage.

At step 3 seismic data relating to the $i^{th}$ receiver is selected. At step 4 the receiver function for the $i^{th}$ receiver is calculated from two parameters of the seismic data acquired at the $i^{th}$ receiver. In one embodiment the receiver function is found by cross-correlating the vertical component of the particle motion acquired at the $i^{th}$ receiver, as one parameter of the acquired seismic data, with a horizontal component of the particle motion acquired at the $i^{th}$ receiver, as another parameter of the acquired seismic data. In this embodiment it is assumed that the horizontal component is the x-component (radial component) of the particle motion at the receiver and that the particle motion recorded at the receiver was the particle velocity, but the invention is not limited to this.

The results of step 4 give a receiver function of the type shown in FIG. 5 or 6(a), for the $i^{th}$ receiver.

At step 5 the receiver function for the $i^{th}$ receiver is normalized, relative to the amplitude of the peak in the receiver function at zero time lag. The result of step is the normalized receiver function as shown in FIG. 6(b) for the $i^{th}$ receiver.

At step 6 the "statics peak" in the normalized receiver function is determined. This may be done using an automatic picking method, for example, or it may be done by outputting the results of step 5 for display by an operator who manually picks the "statics peak".

At step 7 the amplitude of the "statics peak" in the normalized receiver function is determined. At step 8, the amplitude of the "statics peak" is used to normalize the original trace of the horizontal component of the particle motion recorded at the $i^{th}$ receiver.

At step 9 it is determined whether the data from all receivers in the receiver array has been processed. If the result of the determination is "no", a suitable counter is increased by one at step 10, and steps 3 to 9 are then repeated for the $(i+1)^{th}$ receiver.

When a "yes" determination is obtained at step 9, this indicates that data from all receivers in the array has been processed. The results of the processing may then be output at step 11. The data may be output in any suitable form—for example it may be printed onto paper, displayed on a visual display unit, or it may be stored in any suitable form for subsequent retrieval. Alternatively, the data may be subjected to additional processing to determine information relating to the geological structure of the survey location.

The form in which data is output at step 11 can be chosen to suit the particular needs of the user. The data that is output may include some or all of the receiver function produced at step 4, the normalized receiver function produced at step 5, the amplitude of the "static peak" in the normalized receiver function as determined at step 7, or the normalized trace of the horizontal component of the particle motion as determined at step 8. These data may be output for each receiver, or only for selected receivers.

The method of the invention is not limited to performing the steps in the order shown in FIG. 8. For example, step 6 of picking the "statics peak" can be carried out before step 5 of normalizing the receiver function. Furthermore, in the method shown in FIG. 8 steps 3 to 8 are performed in sequence for one receiver, and are then repeated for another receiver and so on. It would alternatively be possible to perform steps 3 and 4 for one receiver, and then repeat steps 3 and 4 for other receivers before moving onto step 5. Similarly, step 5 of normalizing the receiver function could be performed for each receiver before moving onto step 6 of picking the "statics peak". Likewise, step 6 of picking the "statics peak" could be performed for each receiver before moving on to step 7 of determining the amplitude of the "statics peak", and step 7 of determining the amplitude of the "statics peak" could be performed for each receiver before moving onto step 8 of normalizing the horizontal component of the particle motion.

The method of FIG. 8 is suitable if it is possible to identify the "statics peak" or another event relating to the traveltime difference between p- and s-waves through the near-surface in the individual, unstacked receiver functions. In some cases, however, it will not be possible to identify the "statics peak" in the individual receiver functions and, in such cases, it is necessary to include a step of stacking receiver functions to improve the signal-to-noise ratio.

If a stacking step is necessary to allow identification of the "statics peak", step 4 of FIG. 8 would be replaced by the step of calculating all the receiver functions for the $i^{th}$ receiver gather. The $i^{th}$ receiver gather contains all traces recorded at the $i^{th}$ receiver and for each of these traces it is possible to calculate a receiver function. This step is followed by the step (not shown in FIG. 8) of stacking all receiver functions that have been calculated for the $i^{th}$ receiver gather. Steps 5 to 7 of FIG. 8 are then carried out on the stacked receiver function for the $i^{th}$ receiver gather.

The stacking process is then repeated for the receiver functions determined for other receiver gathers.

Figure 9:
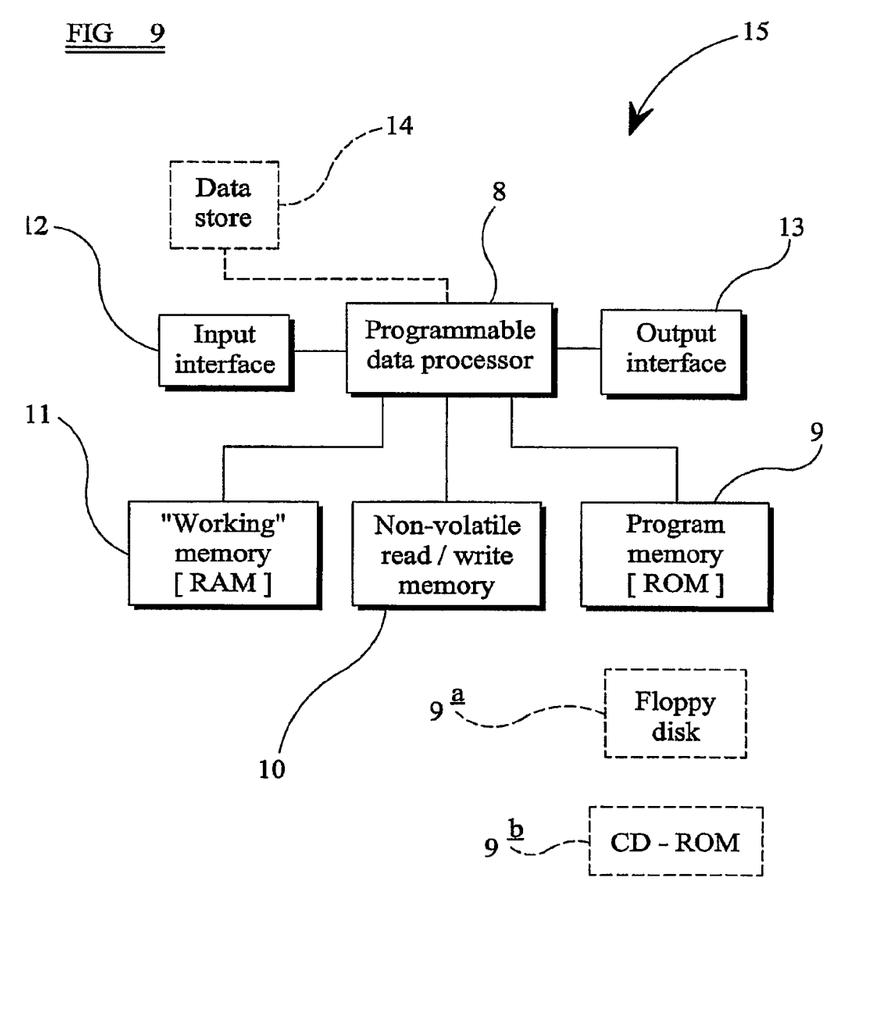
FIG. 9 is a schematic block diagram of an apparatus according to one embodiment of the present invention.

FIG. 9 is a schematic block diagram of a programmable apparatus 15 according to the present invention. The system comprises a programmable data processor 8 with a program memory 9, for instance in the form of a read only memory ROM, storing a program for controlling the data processor 8 to perform, for example, a method as illustrated in FIG. 8. The system further comprises non-volatile read/write memory 10 for storing, for example, any data which must be retained in the absence of power supply. A "working" or "scratchpad" memory for the data processor is provided by a random access memory (RAM) 11. An input interface 12 is provided, for instance for receiving commands and data. An output interface 13 is provided, for instance for displaying information relating to the progress and result of the method. User-defined data may be supplied via the input interface 12 or may optionally be provided by a machine-readable store 14.

The program for operating the system and for performing the method described hereinbefore is stored in the program memory 9, which may be embodied as a semi-conductor memory, for instance of the well-known ROM type. However, the program may be stored in any other suitable storage medium, such as magnetic data carrier 9a (such as a "floppy disc") or CD-ROM 9b.

What is claimed is:

1. A method of processing seismic data including corresponding first and second modes of seismic energy, comprising:

a) processing a trace indicative of a first parameter of the seismic data acquired at a first receiver including events corresponding to the first mode with a trace indicative of a second parameter of the seismic data acquired at the first receiver including events corresponding to the second mode;

b) identifying an event in the processed data corresponding to partial mode conversion; and c) obtaining information from the amplitude and/or the waveform of the event in the processed data corresponding to partial mode conversion.

2. The method of claim 1, wherein the second mode has been generated by partial mode conversion of the first mode at a boundary face of a layer of the earth.

3. The method of claim 1, wherein step (c) comprises normalizing the amplitude in the processed data of the event corresponding to partial mode conversion.

4. The method of claim 3, wherein step (c) comprises normalizing the amplitude in the processed data of the event corresponding to partial mode conversion relative to the amplitude of the processed data at zero time delay.

5. The method of claim 3, comprising the further step of normalizing the trace indicative of the second parameter relative to the normalized amplitude of the event corresponding to partial mode conversion.

6. The method of claim 1, comprising the further step of repeating steps (a), (b) and (c) for seismic data acquired at a second receiver, the second receiver not being co-located with the first receiver.

7. The method of claim 1, wherein the first parameter of the seismic data is a vertical component of particle motion acquired at the respective receiver.

8. The method of claim 7, wherein the second parameter of the seismic data is a horizontal component of particle motion acquired at the respective receiver.

9. The method of claim 7, wherein the second parameter of the seismic data is the component of particle motion acquired at the respective receiver in the direction between a source of seismic energy and the respective receiver.

10. The method of claim 1, wherein at least one of the first and second parameters of the seismic data is obtained by decomposing the seismic data acquired at the respective receiver.

11. The method of claim 1, wherein step (a) comprises cross-correlating the trace indicative of the first parameter of the seismic data acquired at the first receiver with the trace indicative of the second parameter of the seismic data acquired at the first receiver.

12. The method of claim 1, wherein step (a) comprises deconvolving the trace indicative of the first parameter of the seismic data acquired at the first receiver from the trace indicative of the second parameter of the seismic data acquired at the first receiver.

13. An apparatus for processing seismic data including corresponding first and second modes of seismic energy, comprising:

a) means for processing a trace indicative of a first parameter of the seismic data acquired at a first receiver including events corresponding to the first mode with a trace indicative of a second parameter of the seismic data acquired at the first receiver including events corresponding to the second mode;

b) means for identifying an event in the processed data corresponding to partial mode conversion; and c) means for obtaining information from the amplitude and/or the waveform of the event in the processed data corresponding to partial mode conversion.

14. The apparatus of claim 13, further comprising normalizing means for normalizing the amplitude in the processed data of the event corresponding to partial mode conversion.

15. The apparatus of claim 14, wherein the normalizing means are adapted to normalize the amplitude in the cross-correlated data of the event corresponding to partial mode conversion relative to the amplitude of the cross-correlated data at zero time delay.

16. The apparatus of claim 13, further comprising means for normalizing the trace indicative of the second parameter relative to the normalized amplitude of the event corresponding to partial mode conversion.

17. A computer system, comprising:

a processor; and a memory comprising program instructions executable by the processor to:

process a trace indicative of a first parameter of the seismic data acquired at a first receiver including events corresponding to the first mode with a trace indicative of a second parameter of the seismic data acquired at the first receiver including events corresponding to the second mode;

identify an event in the processed data corresponding to partial mode conversion; and obtain information from the amplitude and/or the waveform of the event in the processed data corresponding to partial mode conversion.

* * * * *